(12) United States Patent
Chang

(10) Patent No.: US 11,084,180 B2
(45) Date of Patent: Aug. 10, 2021

(54) CUTTING BLADE FOR BRUSH CUTTER

(71) Applicant: Chi-Cheng Chang, Taichung (TW)

(72) Inventor: Chi-Cheng Chang, Taichung (TW)

( * ) Notice: Subject to any disclaimer, the term of this patent is extended or adjusted under 35 U.S.C. 154(b) by 0 days.

(21) Appl. No.: 16/850,135

(22) Filed: Apr. 16, 2020

(65) Prior Publication Data
US 2021/0069925 A1 Mar. 11, 2021

(30) Foreign Application Priority Data
Sep. 6, 2019 (TW) .................. 108132222

(51) Int. Cl.
*B26D 1/00* (2006.01)
*A01D 34/73* (2006.01)

(52) U.S. Cl.
CPC .......... *B26D 1/0006* (2013.01); *A01D 34/73* (2013.01); *B26D 2001/006* (2013.01); *B26D 2001/0046* (2013.01); *B26D 2001/0053* (2013.01)

(58) Field of Classification Search
CPC ............ B26D 1/0006; B26D 2001/006; B26D 2001/046; B26D 2001/0053; A01D 34/73; A01D 34/733; A01D 34/4166; A01D 34/826; A01D 34/68; Y10S 56/17; B26B 9/00; B26B 9/02
USPC .... 83/662; 30/355, 176, 347, 390, 299, 302, 30/303, 307, 206, 205; 56/255, 295, 289, 56/13.4, 291, 288, 12.7, 17.5, 503; D15/29, 14–18, 10, 11, 28; D8/8, 9, 20, D8/70, 98
See application file for complete search history.

(56) References Cited

U.S. PATENT DOCUMENTS

| | | | | |
|---|---|---|---|---|
| 10,117,380 | B1 * | 11/2018 | Kaukler | A01D 34/826 |
| 2007/0157476 | A1 * | 7/2007 | Hunt | A47L 13/08 30/355 |
| 2017/0325401 | A1 * | 11/2017 | Chang | A01D 34/73 |

FOREIGN PATENT DOCUMENTS

KR 1734411 B1 * 5/2017 ............ A01D 34/01

* cited by examiner

*Primary Examiner* — Ghassem Alie

(57) ABSTRACT

A cutting blade has two ends and two sides and includes a mounting hole mounted on a front housing of a brush cutter; a convex member on a central portion of either side and having two notches at two ends respectively and an intermediate, curved cutting edge; and two cutting edges on either side with the convex member disposed between, each cutting edge having a first end terminated at the notch and a second end terminated at either end. Two cutting edges of different sides with the mounting hole disposed between comprise a plurality of groups of an outward inclined cutting member and a cavity. The other two cutting edges of different sides with the mounting hole disposed between comprise a plurality of groups of an inward inclined cutting member and a recess.

1 Claim, 9 Drawing Sheets

CUTTING BLADE FOR BRUSH CUTTER

BACKGROUND OF THE INVENTION

1. Field of the Invention

The invention relates to blades and more particularly to a cutting blade for a brush cutter capable of completely cutting grass.

2. Description of Related Art

A conventional cutting blade 10 for a brush cutter is shown in FIG. 1 and comprises two ends 14, a mounting hole 11 on a center, a flat member 15 on a central portion of either side, two cutting edges 13 on either side and adjacent to the end 14, and two groups of a plurality of notches 12 on either side and disposed between the flat member 15 and the notches 12.

Another conventional cutting blade 20 for a brush cutter is shown in FIG. 2 and comprises two toothed ends 21, a mounting hole 24 on a center, a protruding member 23 on a central portion of either side, and two cutting edges 22 on either side and adjacent to the ends 21.

A conventional vegetation trimmer head comprises three rotatable, rigid blades which extend during use. The trimmer head has a spool-like shape and includes a central channel having a conically-shaped opening along the bottom surface to assist the operator in attachment and removal of the trimmer head from the trimmer drive shaft. It provides for threaded attachment to the trimmer drive shaft.

While the devices enjoy its success in the market, continuing improvements in the exploitation of cutting blade for brush cutter of this type are constantly being sought.

SUMMARY OF THE INVENTION

It is therefore one object of the invention to provide a cutting blade having two ends and two sides, comprising a mounting hole; a convex member on a central portion of either side and having two notches at two ends respectively and an intermediate, curved cutting edge; and two inclined cutting edges on either side with the convex member disposed between, each inclined cutting edge having a first end terminated at the notch and a second end terminated at either end; wherein two of the inclined cutting edges of different sides with the mounting hole disposed between comprise a plurality of groups of an outward inclined cutting member and a cavity, and the other two inclined cutting edges of different sides with the mounting hole disposed between comprise a plurality of groups of an inward inclined cutting member and a recess.

The above and other objects, features and advantages of the invention will become apparent from the following detailed description taken with the accompanying drawings.

DETAILED DESCRIPTION OF THE INVENTION

Figure 1:
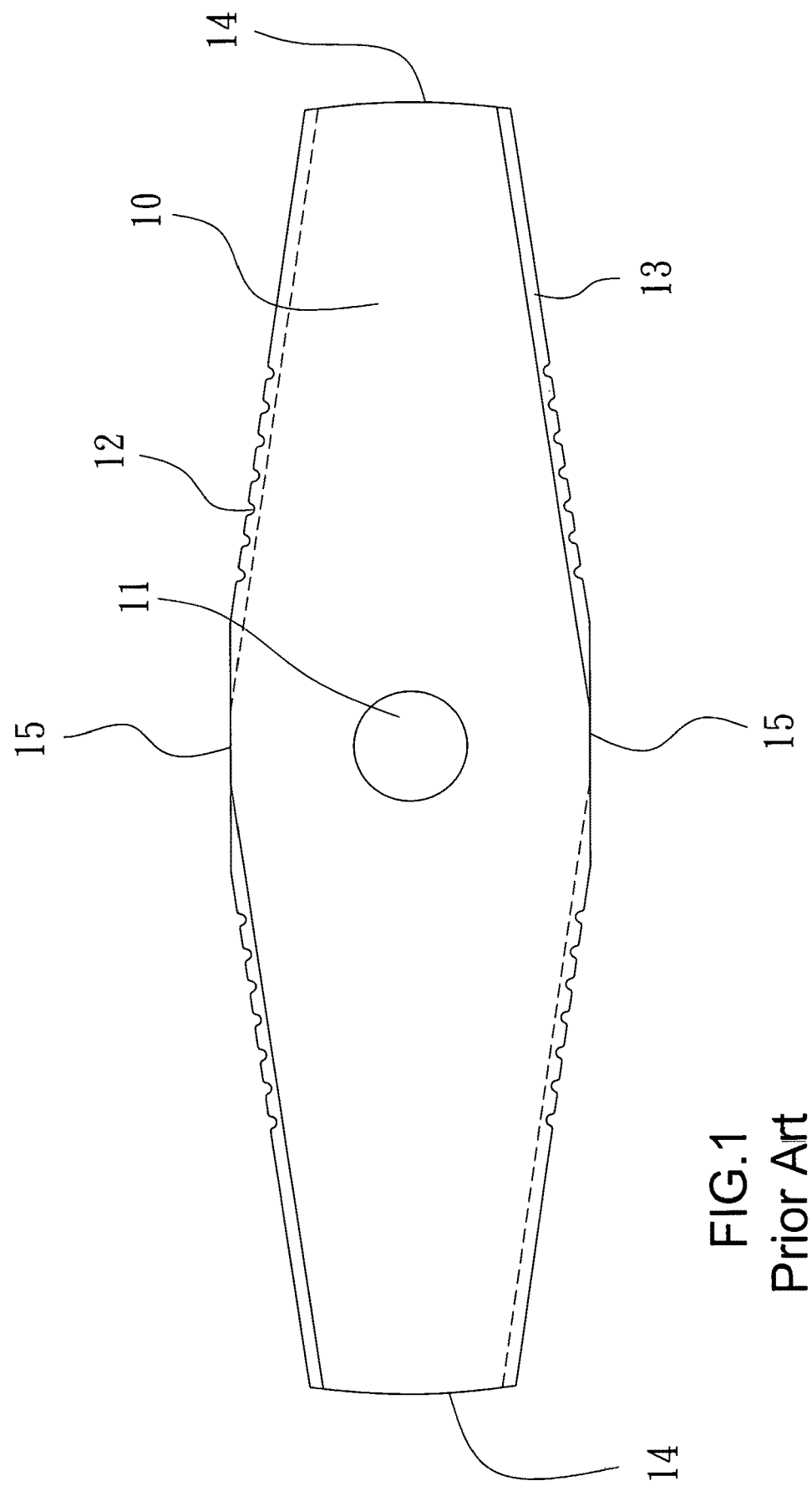
FIG. 1 is a top view of a conventional cutting blade for brush cutter.
Figure 2:
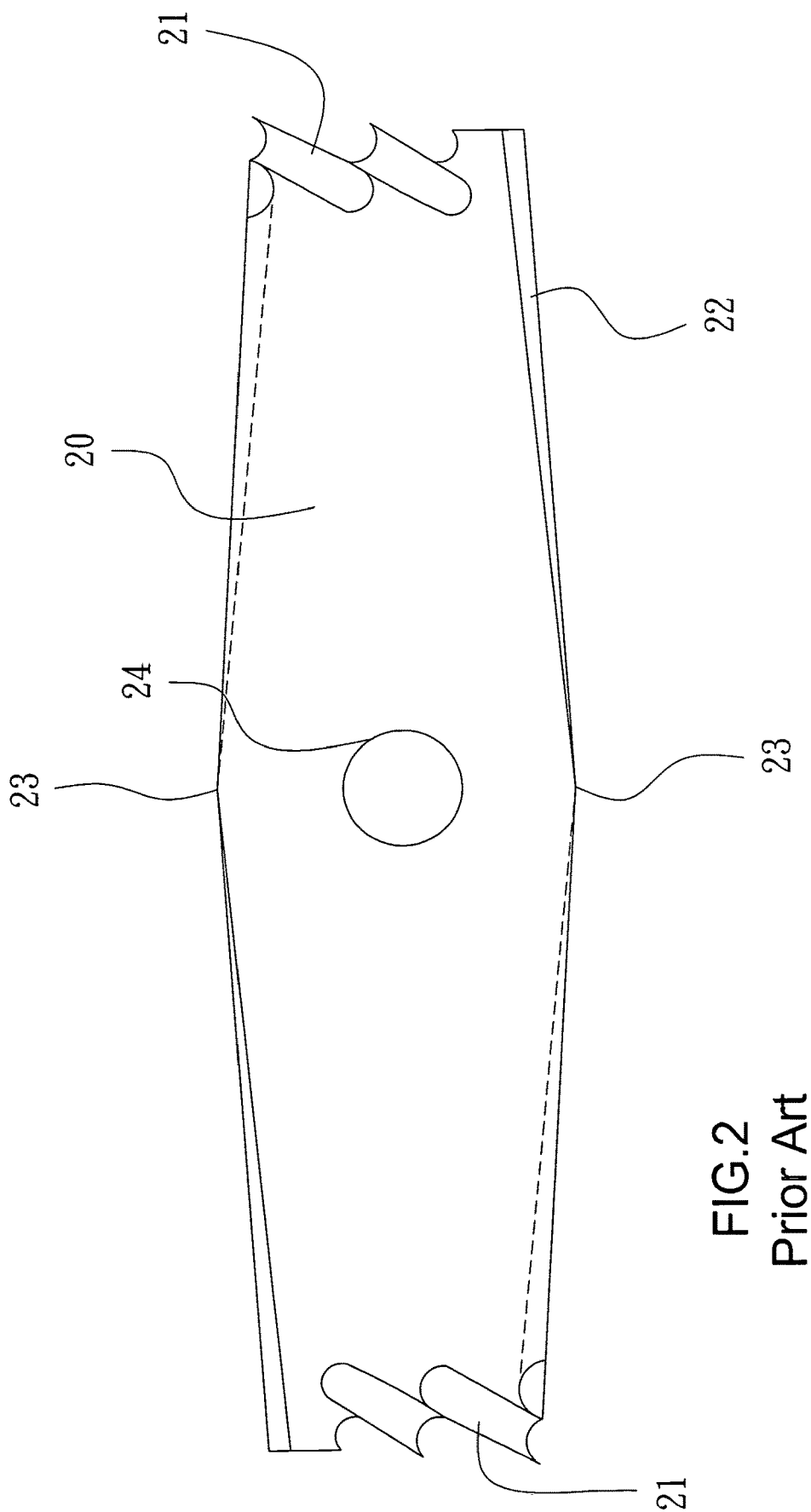
FIG. 2 is a top view of another conventional cutting blade for brush cutter.
Figure 3:
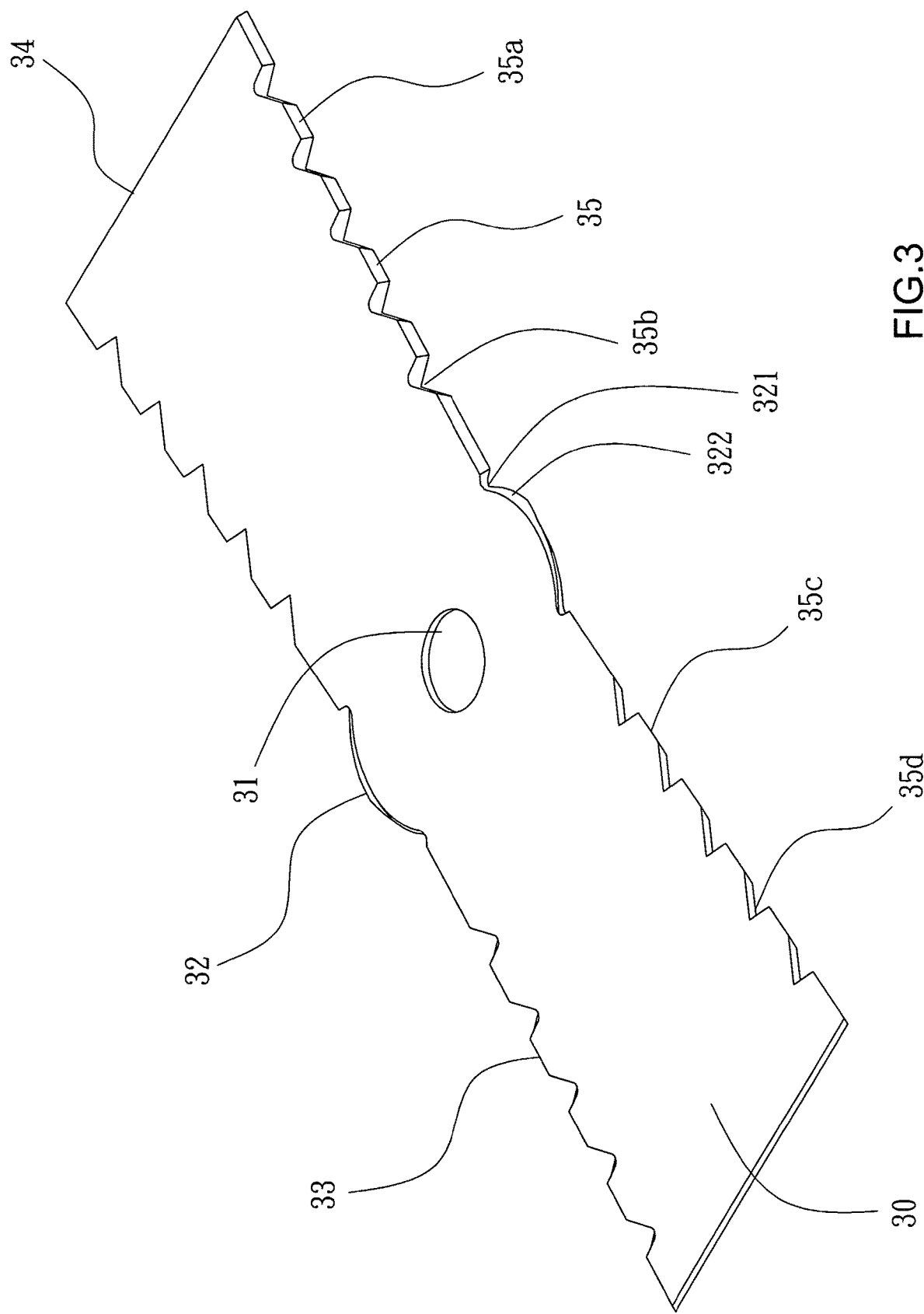
FIG. 3 is a perspective view of a cutting blade according to a first preferred embodiment of the invention.
Figure 4:
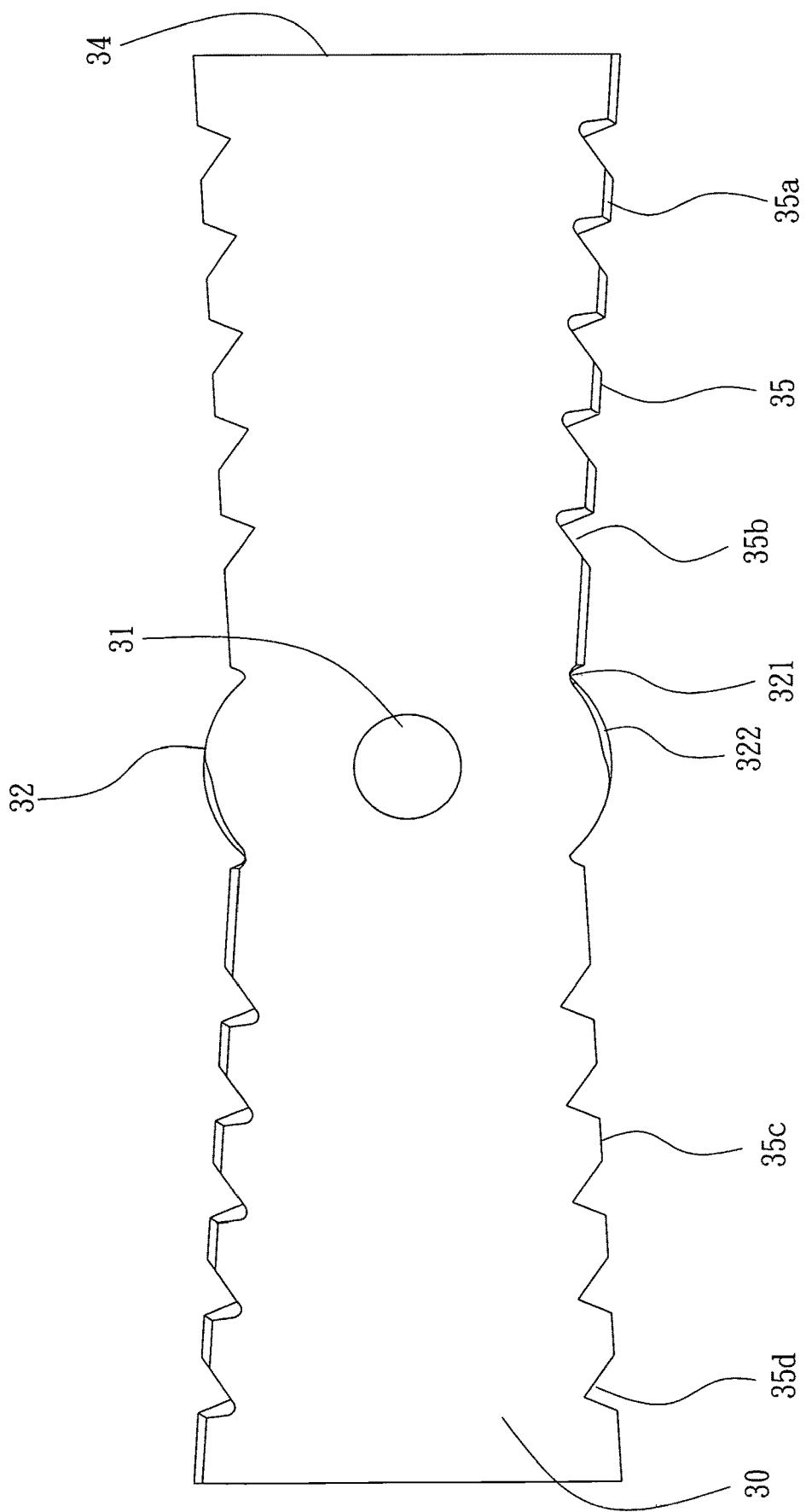
FIG. 4 is a top view of FIG. 3.
Figure 5:
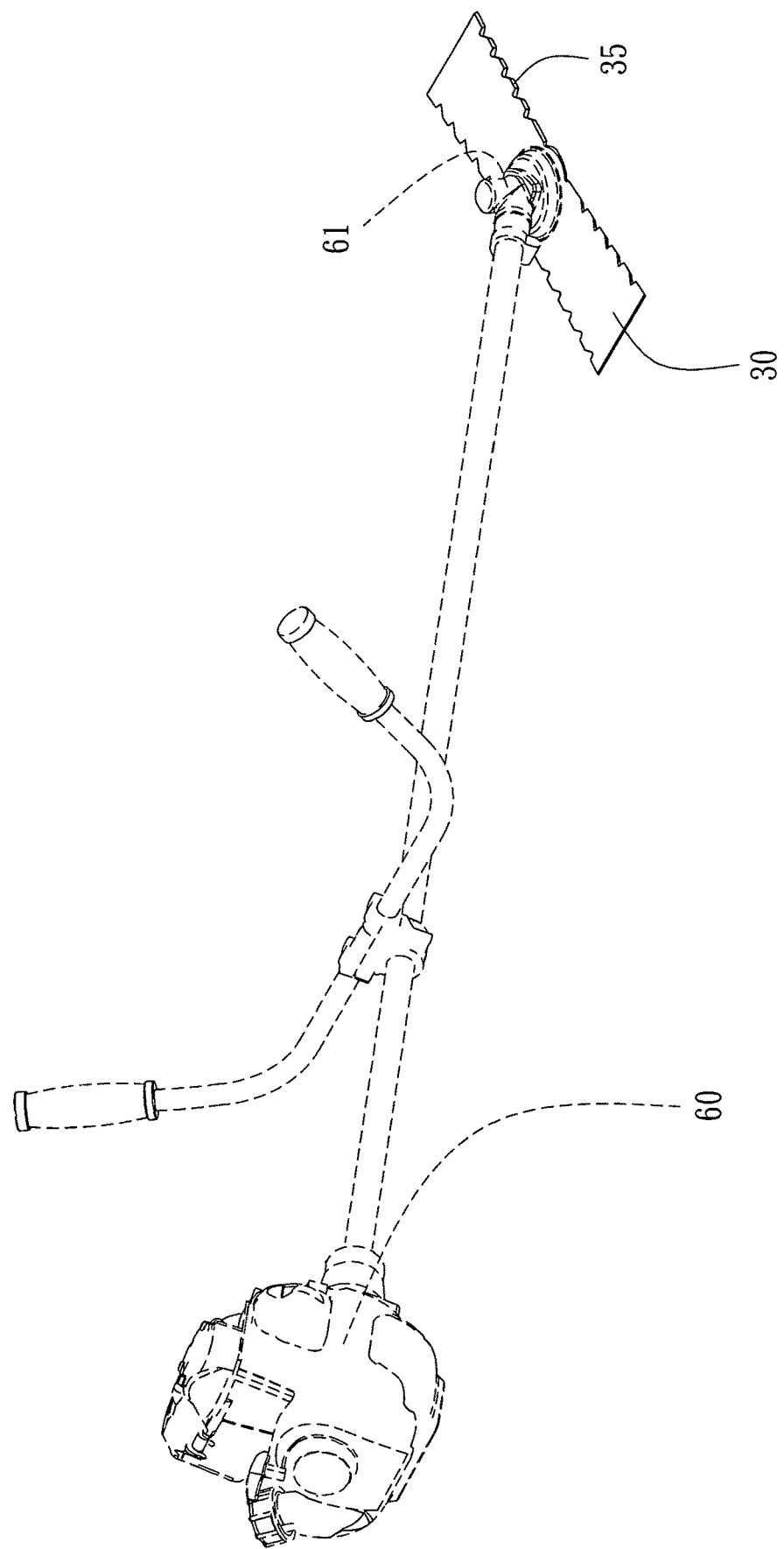
FIG. 5 is an environmental view of the cutting blade mounted to the front housing of a brush cutter.
Figure 6:
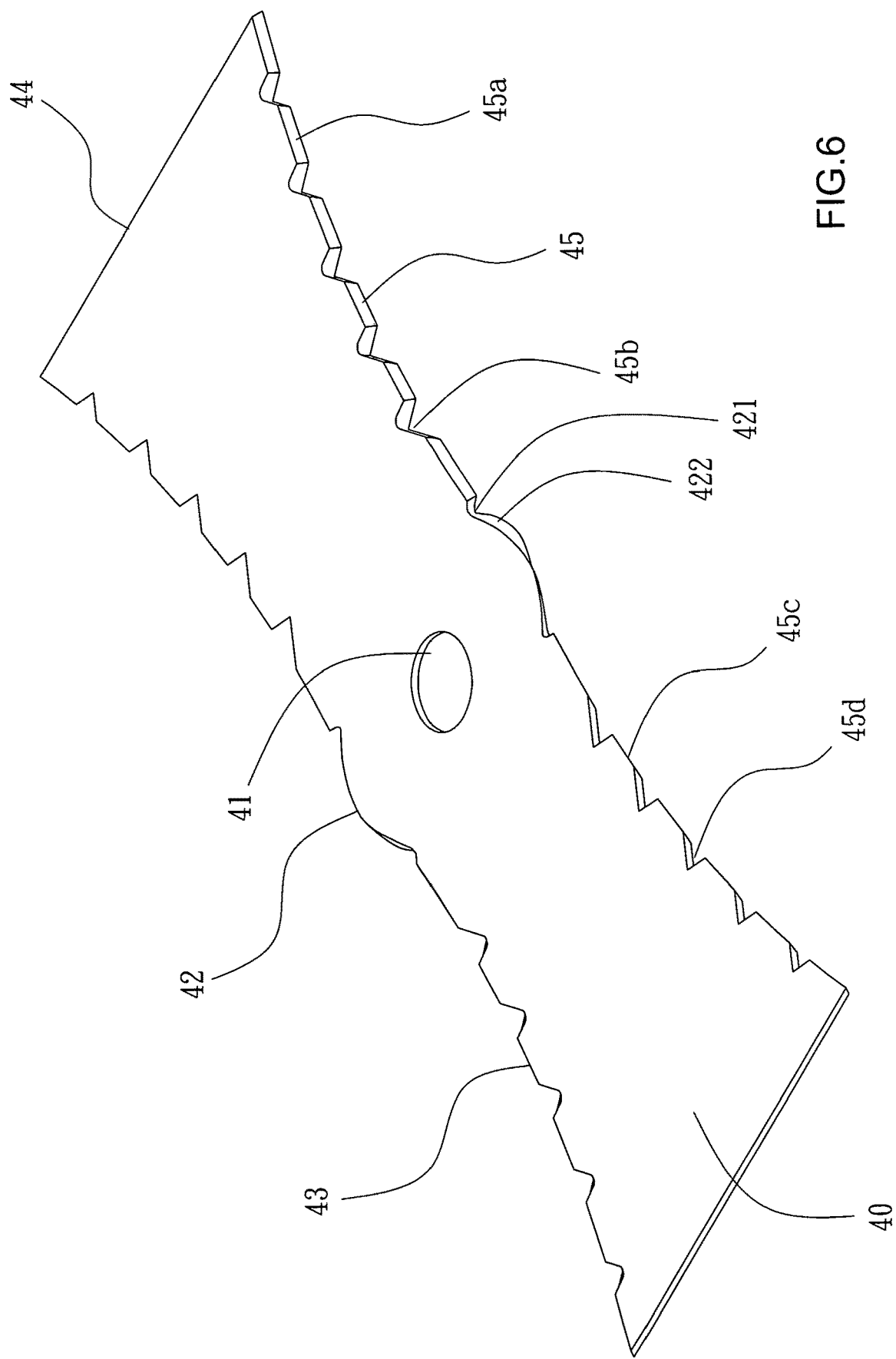
FIG. 6 is a perspective view of a cutting blade according to a second preferred embodiment of the invention.
Figure 7:
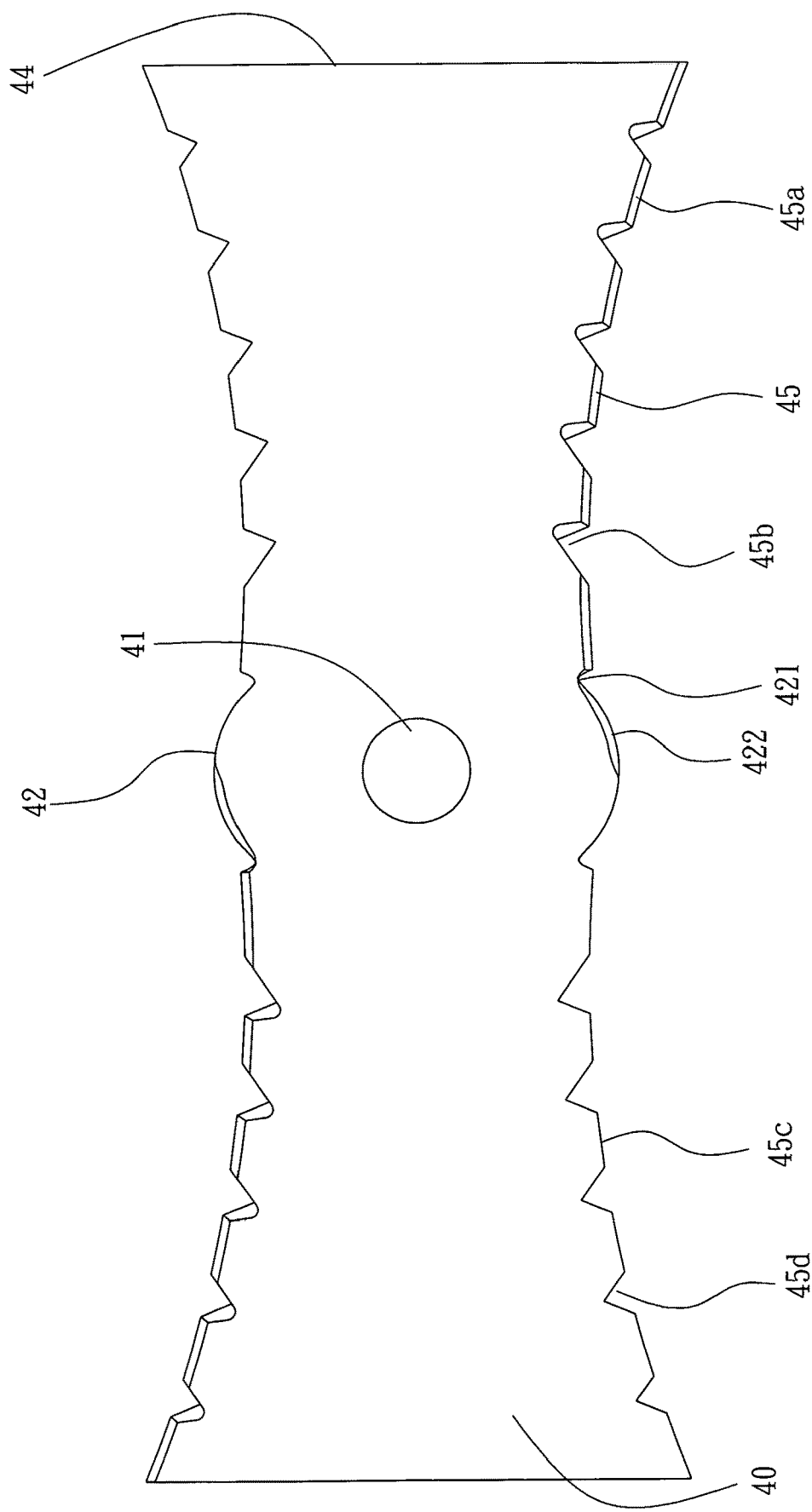
FIG. 7 is a top view of FIG. 6.
Figure 8:
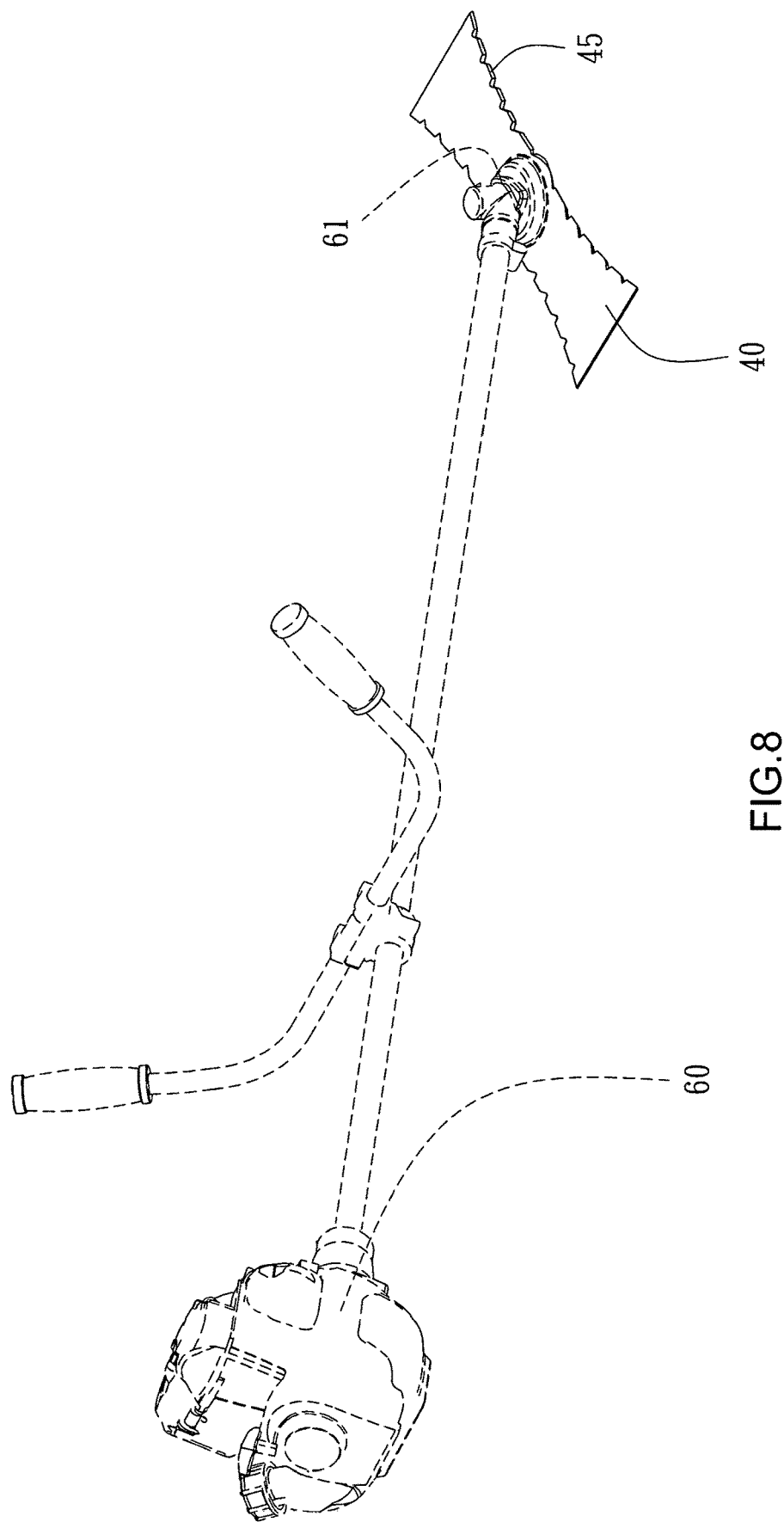
FIG. 8 is an environmental view of the cutting blade of FIG. 6 mounted on the front housing of a brush cutter.

Referring to FIGS. 3 to 5, an elongated cutting blade 30 for a brush cutter 60 in accordance with a first preferred embodiment of the invention comprises a mounting hole 31 mounted to a front housing 61 of the brush cutter 60, a convex member 32 on a central portion of either side 33 and having two notches 321 at two ends respectively and an intermediate, curved cutting edge 322, and two inclined cutting edges 35 on either side 33 with the convex member 32 disposed between, each cutting edge 35 having a first end terminated at the notch 321 and a second end terminated at either end 34. Two cutting edges 35 at different sides 33 with the mounting hole 31 disposed between comprise a plurality of groups of an outward inclined cutting member 35a and a cavity 35b. The other two cutting edges 35 at different sides 33 with the mounting hole 31 disposed between comprise a plurality of groups of an inward inclined cutting member 35c and a cavity 35d.

It is envisaged by the invention that the outward inclined cutting members 35a, the cavities 35b, 35d, the inward inclined cutting members 35c, the notches 321, and the intermediate, curved cutting edges 322 together can completely cut grass.

Referring to FIGS. 6 to 9, an elongated cutting blade 40 for a brush cutter 60 in accordance with a first preferred embodiment of the invention comprises a mounting hole 41 mounted to a front housing 61 of the brush cutter 60, a convex member 42 on a central portion of either side 43 and having two notches 421 at two ends respectively and an intermediate, curved cutting edge 422, and two curved cutting edges 45 on either side 43 with the convex member 42 disposed between, each cutting edge 45 having a first end terminated at the notch 421 and a second end terminated at the end 44. Two cutting edges 45 at different sides 43 with the mounting hole 41 disposed between comprise a plurality of groups of an outward inclined cutting member 45a and a cavity 45b. The other two cutting edges 45 at different sides 43 with the mounting hole 41 disposed between comprise a plurality of groups of an inward inclined cutting member 45c and a cavity 45d.

It is envisaged by the invention that the outward inclined cutting members 45a, the cavities 45b, 45d, the inward inclined cutting members 45c, the notches 421, and the intermediate, curved cutting edges 422 together can completely cut grass 51.

Figure 9:
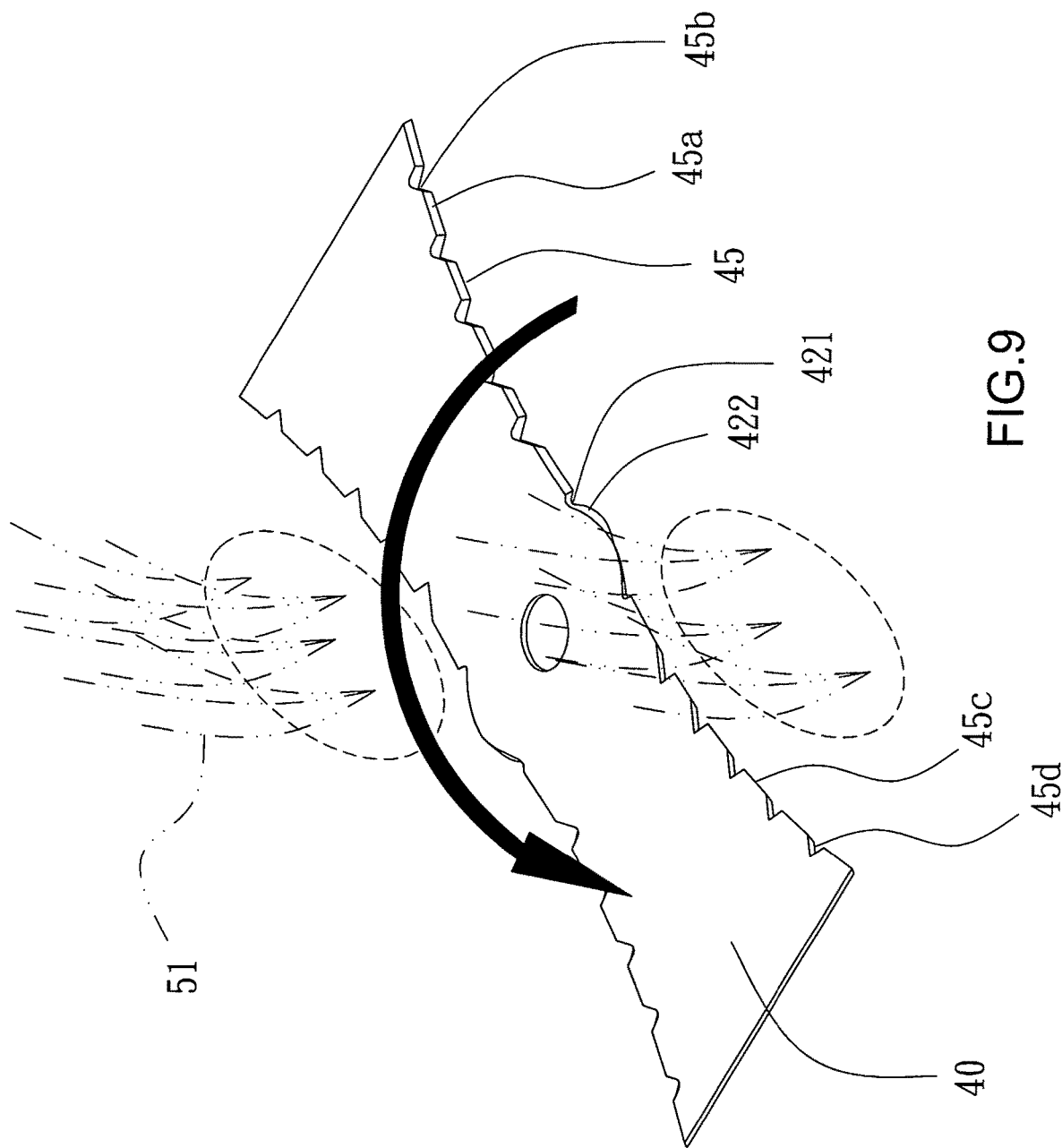
FIG. 9 is a perspective view of the cutting blade of FIG. 6 showing grass being cut.

As shown in FIG. 9 specifically, the cutting blade 40 rotates counterclockwise so that the outward inclined cutting members 45a, the cavities 45b, 45d, and the inward inclined cutting members 45c can cut the grass 51 contacting all portions of the cutting blade 40 except the central portion of the cutting blade 40. Further, the notches 421 and the intermediate, curved cutting edges 422 can cut the grass 51 contacting the central portion of the cutting blade 40. As a result, the cutting blade 40 is capable of cutting the grass 51 completely.

While the invention has been described in terms of preferred embodiments, those skilled in the art will recognize that the invention can be practiced with modifications within the spirit and scope of the appended claims.

What is claimed is:

1. A cutting blade having two straight ends and two sides, comprising:
two convex members each on a central portion of either side of the two sides of the cutting blade, each of said convex members including two notches at two ends respectively and an intermediate, curved cutting edge;
a mounting hole disposed between the convex members; and
two inclined cutting edges on either side of the two sides of the cutting blade with the convex member disposed between, each of said inclined cutting edges having a first end terminated at one of the notches and a second end terminated at either end of the two straight ends of the cutting blade;
wherein one of said inclined cutting edges of either side of the two sides of the cutting blade comprise a plurality of groups of an outward inclined cutting member and a cavity; and
wherein the other one of said inclined cutting edges of either side of the two sides of the cutting blade comprise a plurality of groups of an inward inclined cutting member and a recess.

\* \* \* \* \*